United States Patent [19]

Tolliver

[11] Patent Number: 4,493,538
[45] Date of Patent: Jan. 15, 1985

[54] LATERAL VIEW EXTENDER DEVICE

[76] Inventor: Peter M. Tolliver, 42 Varinna Dr., Rochester, N.Y. 14618

[21] Appl. No.: 423,231

[22] Filed: Sep. 24, 1982

[51] Int. Cl.³ .............................. G02C 7/08; G02C 9/04
[52] U.S. Cl. ........................................ 351/57; 351/41; 351/59
[58] Field of Search ................ 351/47, 48, 57, 58, 351/41, 59

[56] References Cited

U.S. PATENT DOCUMENTS 4,155,633  5/1979  Benavie ................................. 351/41

Primary Examiner—Rodney B. Bovernick
Attorney, Agent, or Firm—Samuel R. Genca

[57] ABSTRACT

A lateral view extender device for Homonymous Hemianopsia is disclosed. The device is particularly useful with eyeglasses having a pair of lenses and a nose bridge separating the pair of lenses. The device includes a dichroic half lens having the combined optical properties of a reflector and a see through lens and means for fixing the dichroic half lens to the nose bridge of the eyeglasses in optical registry with one lens of the pair of lenses for providing at least one optical path through the one lens of the pair of lenses and the dichroic half lens and at least one other optical path over the dichroic half lens. The dichroic lens forms an interior angle with the one lens of the pair of lenses for providing mirror images on the dichroic lens within the one optical path thereby extending the lateral view of a person suffering from Homonymous Hemianopsia proportionally to the interior angle formed between the dichroic lens and the one lens of the pair of lenses.

10 Claims, 11 Drawing Figures

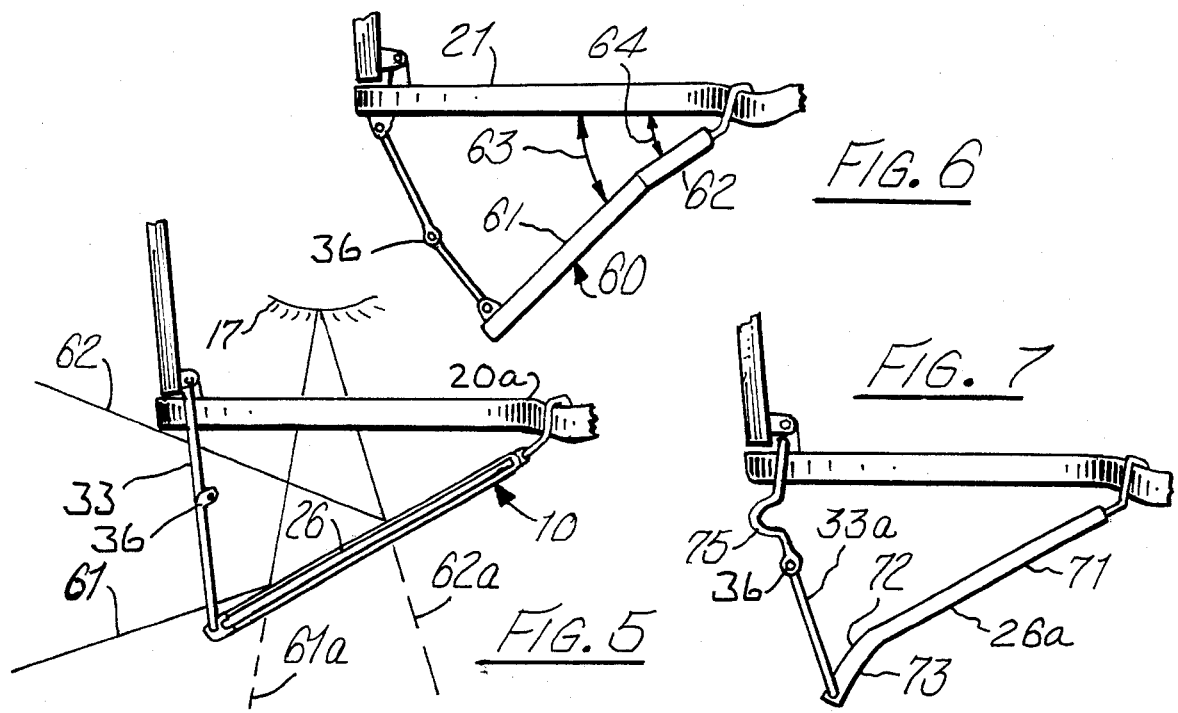
FIG. 6
FIG. 7
FIG. 5
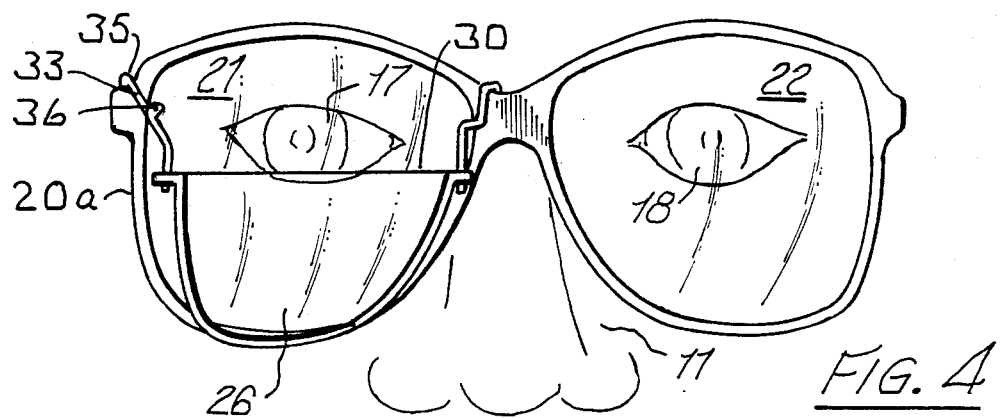
FIG. 4
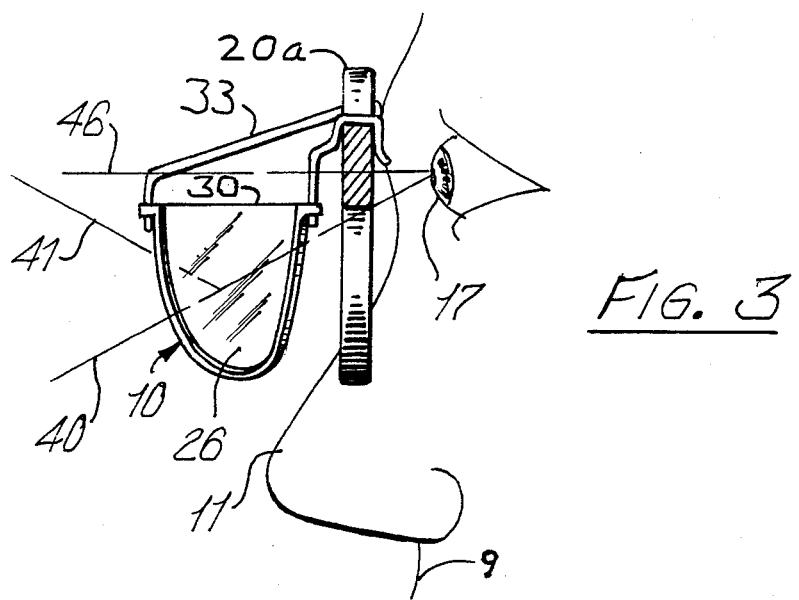
FIG. 3

THE IMPAIRED FIELD

LATERAL VIEW EXTENDER DEVICE

BACKGROUND OF THE INVENTION

1. Field of the Invention

The present invention relates to an optical device for increasing the visual field of view of a person suffering from Homonymous Hemianopsia which is a loss of part of the visual field while the remaining part of the visual field is normal or correctable with eyeglasses. Homonymous Hemianopsia is generally the loss of one-half of a visual field wherein both eyes are affected. Homonymous Hemianopsia is a condition which may result from a number of catastrophic occurrences such as stroke, brain tumor or lesions in the brain. The visual field defect is called congruous when the visual defect or loss of visual field is exactly the same for both eyes and incongruous when there are differences between both eyes. Many people with Homonymous Hemianopsia are not aware of this visual disability since they manage to compensate by employing abrupt eye movements to the hemianopic side, fixate excessively towards the hemianopic side or move the head from side to side. Hemianopsia is usually absolute and when homonymous, the same side of both eyes is affected.

2. Prior Art

Attempts have been made in the past to provide Homonymous Hemianopsia corrective devices to increase the overall field of view over the limited angular field of view of uncorrected vision of a person suffering from Homonymous Hemianopsia. One such prior art device includes first and second space reflectors disposed in front of one of the two eyes of a person suffering from Homonymous Hemianopsia. The first and second reflectors block the direct field of view of the one eye and substitute in its place a virtual image of an additional angle of sight as more fully described in U.S. Pat. No. 4,155,633 entitled "Corrective Optical Device for Homonymous Hemianopsia" issued to Jerold J. Benavie. Other attempt include a dental mirror connected to a pair of eyeglasses to observe laterally disposed objects with the mirror.

None of the aforesaid prior art attempts and no other means are known to the applicant to utilize an optical device which increases the lateral view of a person having Homonymous Hemianopsia with minimum obstruction of the forward visual field, is inexpensive to manufacture, light in weight, easy to use and extends the lateral view without loss of the front view.

SUMMARY OF THE INVENTION

Briefly described, a homonymous hemianopsia lateral extender device in accordance with a preferred embodiment of the invention is particularly useful with eyeglasses having a pair of lenses separated by a nose bridge. The device includes a dichroic half lens having the combined optical properties of a reflector and a see through or transparent lens. The device includes a means for fixing the dichroic half lens to the nose bridge of the eyeglasses in optical registry with one lens of the pair of lenses for providing at least one optical path through the one lens of the pair of lenses and the dichroic half lenses and at least one other path over the dichroic half lens. The dichroic half lens is angularly disposed with the one lens of the pair of lenses to form an interior angle for providing a lateral reflective optical path intersecting the one optical path to thereby display reflected mirror images of laterally disposed objects on the dichroic lens without substantially affecting the transparency of the dichroic lens in the one optical path. The device thereby increases the lateral field of vision proportionately to the interior angle between the dichroic lens and the lens of the pair of lenses without affecting the one other optical path or materially affecting the one optical path.

BRIEF DESCRIPTION OF THE DRAWINGS

The invention will be better understood upon consideration of the following detailed description taken together with the accompanying drawings in which are like elements in various figures having like designations and in which:

FIG. 3 is a side view of the lateral Lateral View Extender Device in accordance with a preferred embodiment of the invention being worn by a person having Homonymous Hemianopsia;

FIG. 4 is a front view of the Lateral View Extender Device similar to that shown in FIG. 3;

FIG. 5 is a top view of the Lateral View Extender Device in FIGS. 3 and 4;

FIG. 6 is a top view of another Lateral View Extender Device which device includes a double dichroic lens;

FIG. 7 is a top view of still another Lateral View Extender Device having a dichroic lens which includes a flat portion and a curved portion;

DESCRIPTION OF THE PREFERRED EMBODIMENT

Figure 8:
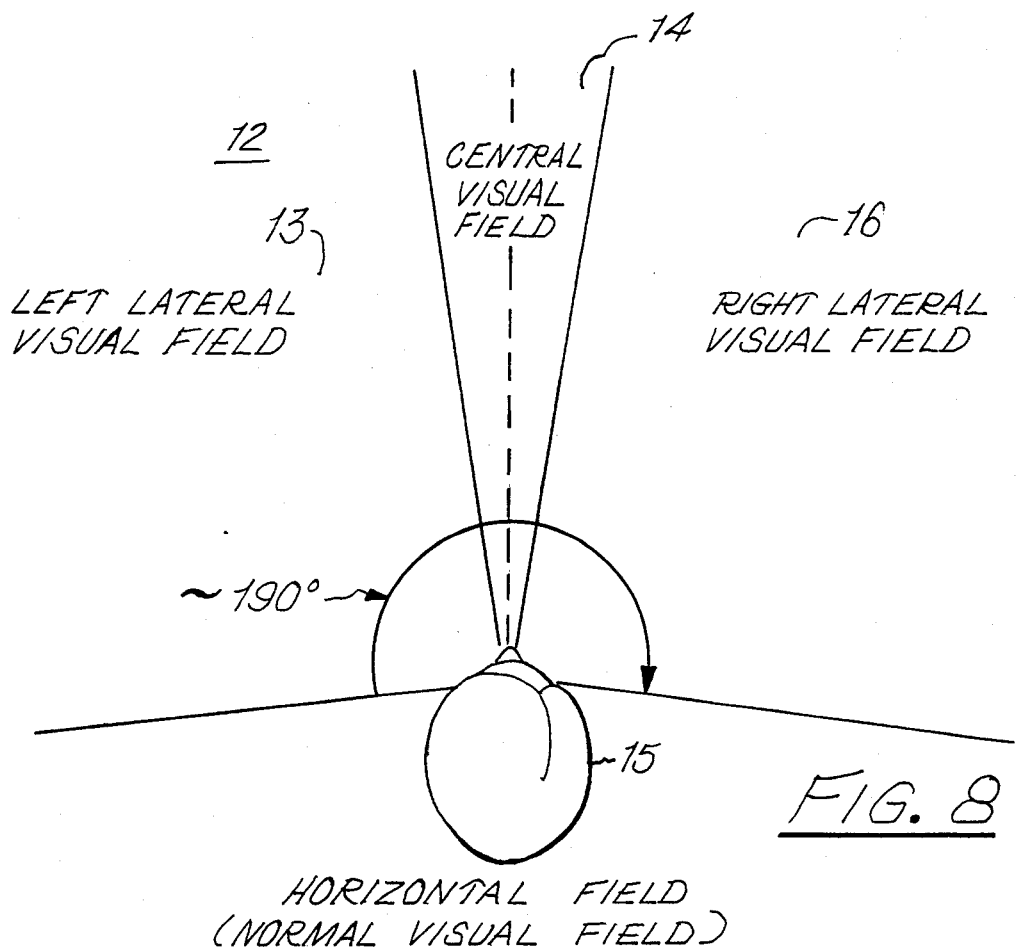
FIG. 8 is a diagram showing the normal horizontal visual field and its components viewed by an individual with normal field vision.

Referring to FIGS. 1-5 of the drawings, a lateral view extender device 10 in accordance with a preferred embodiment of the invention is shown. The invention is useful for a person 11 suffering from either left or right Homonymous Hemianopsia. The device 10, for illustrative purposes, is for a person 11 having right lateral homonymous hemianopsia, the visual condition of which is graphically shown in FIG. 10. As shown in FIG. 8, the normal horizontal visual field 12 for an individual 15 is approximately 190° and includes a left lateral visual field 13, a central or macular visual field 14 and a right lateral visual field 16. The person 11 suffering from right lateral homonymous hemianopsia may lose the right lateral visual field 16 in part or in whole and even part of the central or macular field 14 without affecting the visual acuity or visual performance of the left lateral visual field 13 and the macular field 14.

Figure 10:
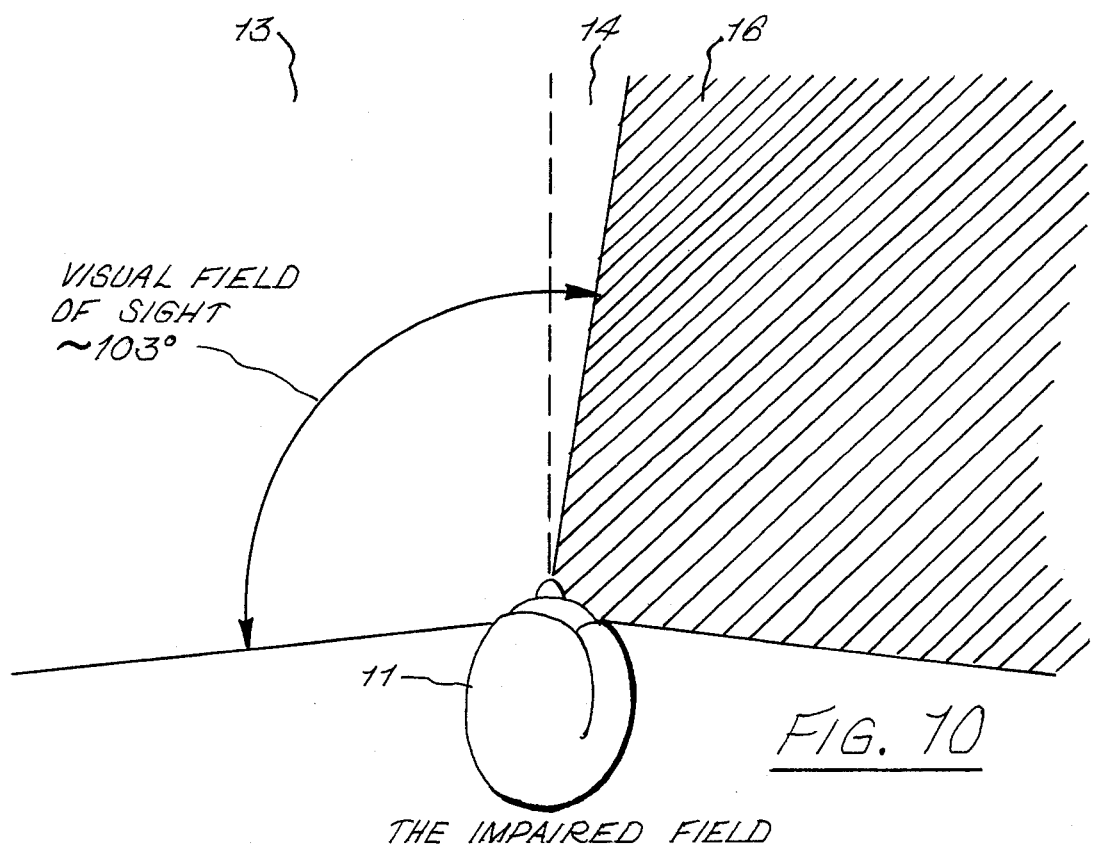
FIG. 10 is a diagram showing an impaired horizontal visual field of a person suffering from Homonymous Hemianopsia.

In FIG. 10, the person 11 suffering from right lateral Homonymous Hemianopsia has retained approximately 103° of sight which includes the left lateral visual field 13 for both eyes 17, 18 (FIG. 4) of a person 11. It should be understood that the same side of both eyes, 17, 18 are affected and each eye 17, 18 sees the horizontal visual field 13 as illustrated in FIGS. 8 and 10.

Figure 2:
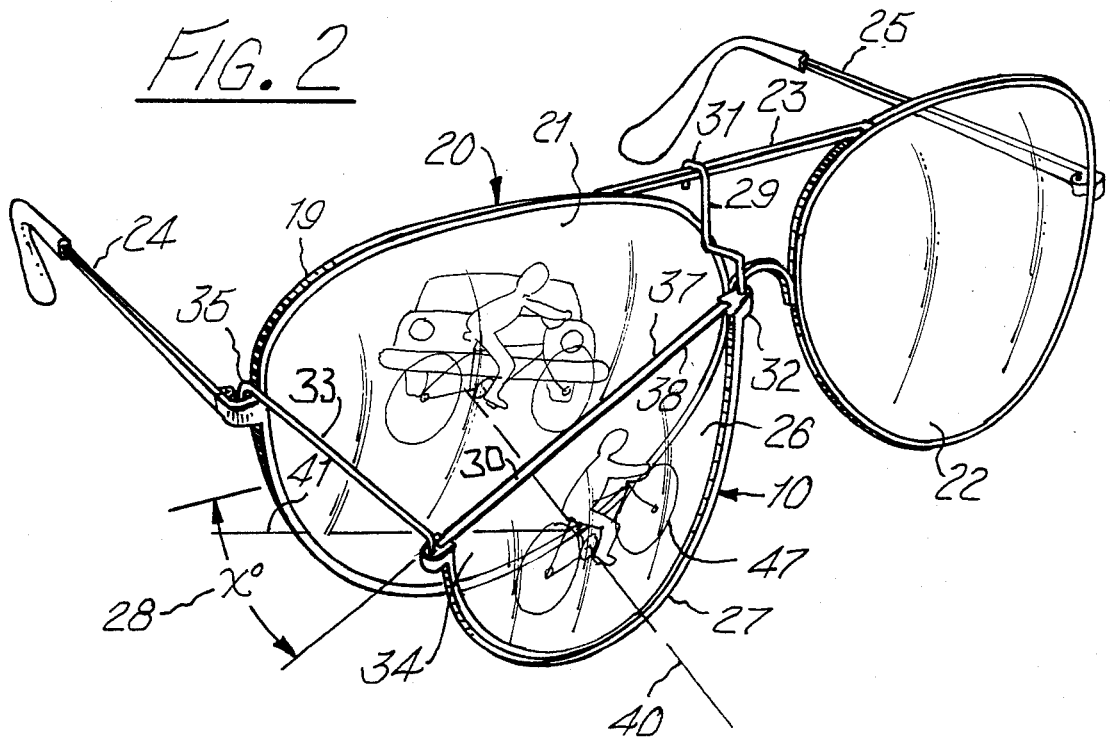
FIG. 2 is a perspective view of the lateral View Extender Device in accordance with a preferred embodiment of the invention.

Referring to FIG. 2, the lateral view extender device 10 in accordance with the preferred embodiment of the invention is particularly useful with eyeglasses 20 having a pair of lenses namely, right lens 21 and left lens 22, separated by a nose bridge 23 separating the pair of lenses 21, 22. The eyeglasses 20 also include a right temple 24 and a left temple 25, pivotally mounted to an eyeglass frame 19. The eyeglasses 20 are usable in a normal way for prescriptive eye wear or may be plain lenses such as those used in safety glasses without prescription. The device 10 includes a dichroic lens 26 and a frame 27 for mounting the dichroic lens 26 in optical registry with the right lens 21 of the eyeglasses 20 and at an angular position with right lens 21. The dichoric lens 26 and the right lens 21 form an interior angle 28 of "x" degrees wherein the "x" degrees may be selectively varied to increase or decrease the right lateral horizontal vision 16 proportional to the interior angle 28. In a preferred embodiment of the invention, an interior angle 28 of 55° has been found to work satisfactorily for the device 10. The interior angle 28 of course may be varied selectively to obtain a right lateral horizontal view 16 proportional to the interior angle 28. The frame 27 includes a nose bridge bracket 29 which includes a book portion 31 for hooking onto the nose bridge 23 of the eyeglasses 20. The bracket 29 in cooperation with the nose bridge 23 clamps the proximal side 32 of the dichroic lens 26 to form the interior angle 28. The device 10 includes a spacer bar 33 for separating the distal end 34 of the dichroic lens 26 from the right lens 21 and includes a spring loaded clamp portion 35. The spacer bar 33 may include a hinge 36 (FIGS. 4, 5) for folding the bar 33 and placing the dichroic lens 26 in a stowed position folded flat against the eyeglass frame 19.

FIG. 2 shows the dichroic lens 26 in the operational position. The interior angle 28 may be adjusted by changing the length of the space bar 33 by bending the open loop 75 (FIG. 7). Dichroic lens 26 has the optical properties of both a reflector and see-through or transparent lens. The dichroic lens 26 in the preferred embodiment includes two parallel flat plane surfaces 37, 38, one surface 38 of which is partly coated with reflective material in such a manner as to provide transparency in at least one optical path 40 and mirror images of objects lying within at least one lateral optical path 41 on the surface 38.

Figure 9:
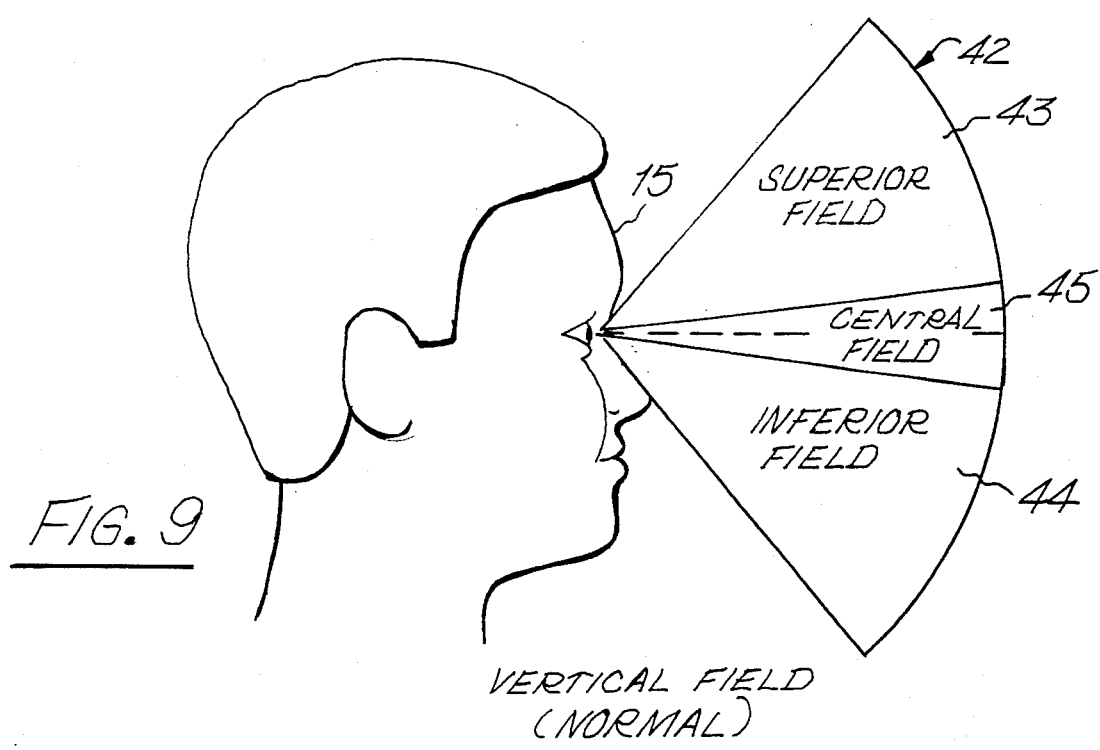
FIG. 9 is a side view showing the normal vertical visual field and its components by an individual having normal field vision.

Referring to FIG. 9, the individual 15 is shown with a normal vertical field of vision which includes a superior field 43 and an inferior field 44 separated by a vertical central field 45. A person 11 suffering from Homonymous Hemianopsia may retain the visual acuity or visual performance within the vertical visual field 42 and the lateral horizontal field of vision 12 even through the right lateral horizontal field 16 may be lost.

Referring again to FIGS. 2, 3 and 4, the dichroic lens 26 is disposed in the inferior field 44 of the person 11 so that the eye 17 is above an upper edge 30 of the dichroic lens 26. The dichroic lens 26 does not affect the vision of the person 11 in the central field 45 or the superior field 43. The dichroic lens 26 is disposed below an optical path 46 so that the optical path 46 is not disturbed by the dichroic lens 26.

The optical path 40 is a sight path through the lens 21 and dichroic lens 26 in the forward direction. The device 10 has the advantage that mirror images 47 of object (bicycle 48) in a side or lateral direction along the lateral optical path 41 may be observed simultaneously in the optical path 40 on the reflecting surface 38 of the dichroic lens 26. The optical paths 40, 41 intersect so that the mirror image 47 on optical path 41 may be seen within the optical path 40. If desired, the person 11 may raise his head 9 with the device 10 to also see the automobile 50 in the forward direction and the bicycle 48 simultaneously without looking into the optical path 46.

Figure 1:
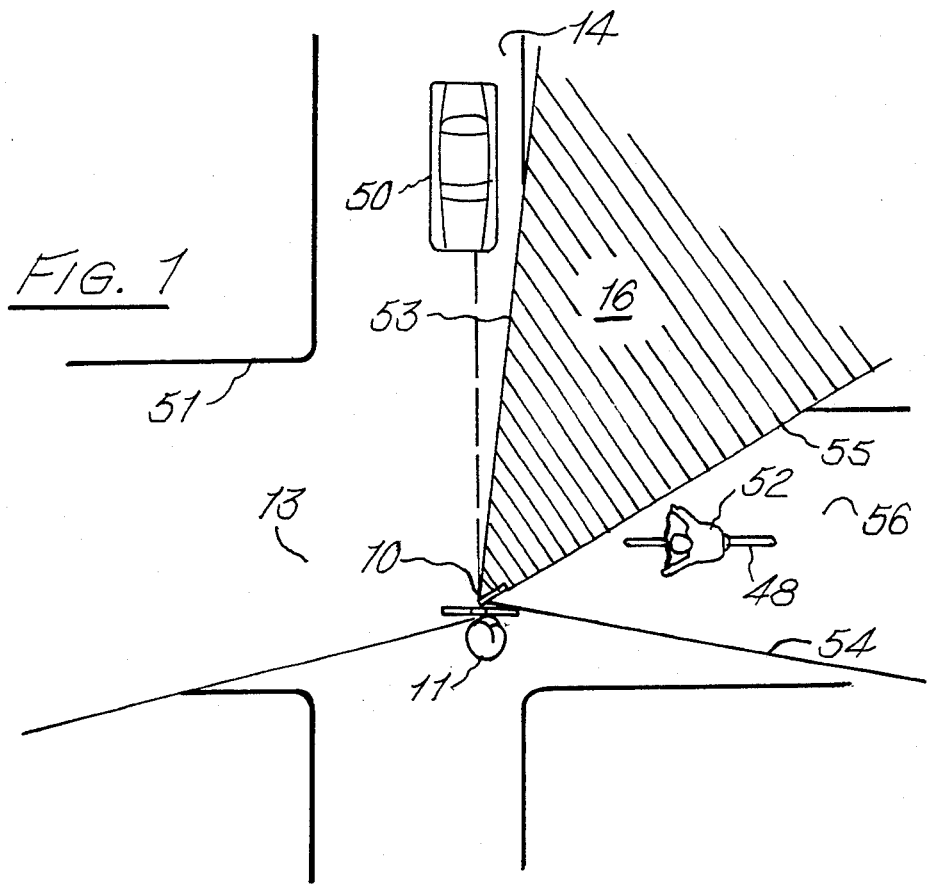
FIG. 1 is a top view of the Lateral View Extender Device in accordance with a preferred embodiment of the invention in use at an intersection of traversing roads with an oncoming automobile in one direction and a bicycle with a driver approaching the intersection at an approximate right angle in another direction to the oncoming automobile.

In the operation of the device 10, an example is illustrated in FIG. 1 wherein an oncoming automobile 50 is approaching an intersection 51 while a bicycle 48 and driver 52 are approaching the same intersection 51 from different directions relative to the person 11 suffering from Homonymous Hemianopsia. As mentioned hereinbefore, the person 11 has vision in the lateral left horizontal field 13 and part of the central field 14 and a loss of field in the lateral right horizontal field 16 extending between intersecting lines 53, 54. The bicycle 48 lies within the lost lateral right horizontal field 16 and is not visible to the person 11. The lateral view extender device 10 in accordance with the invention permits the person 11 to see mirror images 47 of objects (bicycle 48) in a lateral optical path 41 lying between intersecting lines 54, 55 within the right lateral horizontal field 16. The intersection lines 54, 55 define an extended lateral visual field 56 available with the use of the device 10 and not otherwise visible to a person with Homonymous Hemianopsia. A mirror image of the bicycle 48 is superimposed upon the forward vision of the person 11 wearing the lateral view extender device 10, integrated into a person's total vision.

FIG. 5 shows light rays 61 and 62 within the lateral optical path 41 impinging on the dichroic lens 26 to present mirror images 47 on the dichroic lens 26 visible to the eye 17. Light rays 61a, 62a within the optical path 40 and extending through the lens 21 and dichroic lens 26 permit forward vision. Thus, the human visual system (not shown) of person 11 can perceive the bicycle 48 and the automobile 50 simultaneously.

Figure 11:
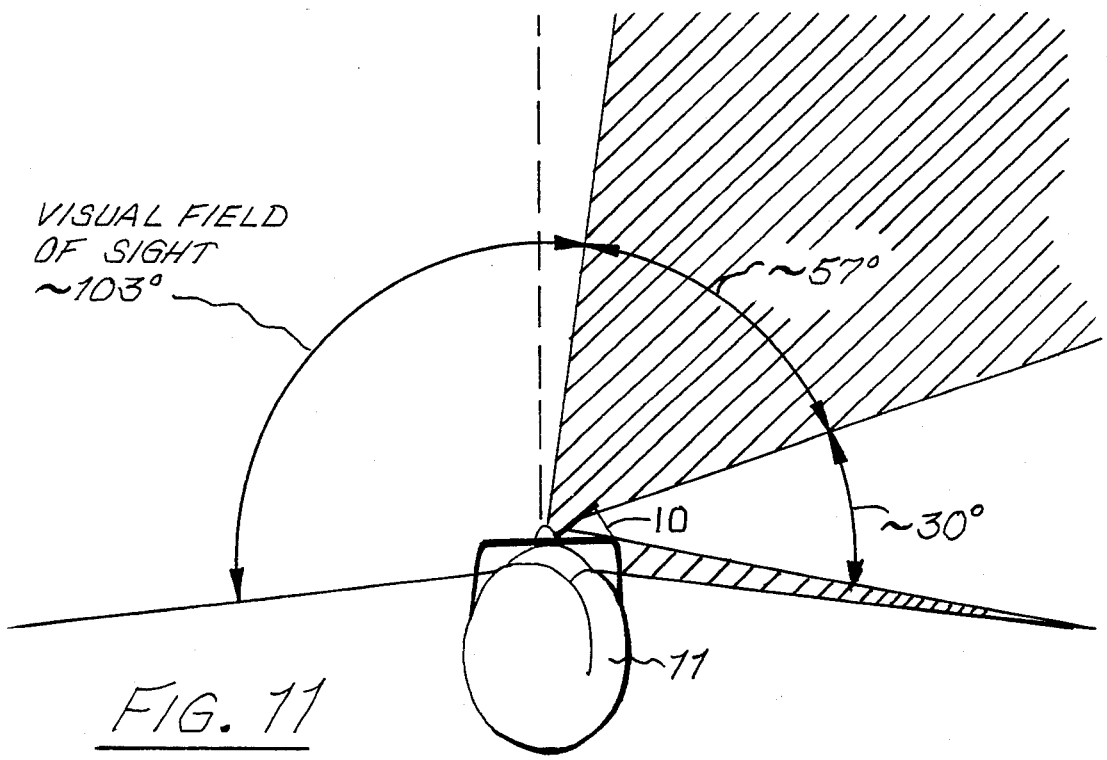
FIG. 11 is a diagram showing how the horizontal impaired visual field may be corrected by an individual wearing a Lateral View Extender Device in accordance with the invention.

FIG. 11 is a graphic illustration of the operation of the device 10 similar to FIG. 1. The device 10 extends the lateral right horizontal visual field 16 approximately 30° within the lost lateral right horizontal visual field 16 which is now reduced to approximately 57°. The addition of 30° of visual field in the lateral right horizontal visual field 16 is significant when you consider the total loss of vision in the lateral right visual field 16. It should also be noted that a hard stare reduces the visual field 12 while relaxed viewing allows visual field to widen from 103° to approximately 115°.

Referring to FIGS. 2–5, the device 10 may be mounted on different styles of eyeglasses, for example, the type shown in FIG. 2 or the eyeglass 20a shown in FIGS. 3–5.

FIG. 6 shows another embodiment of the invention in a lateral view extender device 60 similar to the device 10 except that the dichroic lens 26 of device 10 is modified to include two dichroic lenses 61, 62 jointed in a side-to-side relationship to extend the right lateral horizontal visual field 16 by each lens 61, 62 forming their own interior angle 63, 64 respectively with the lens 21. This embodiment of the invention not only extends the lateral view on lens 62 but also a forward view on lens 61.

Modifications and alterations may occur to those skilled in the art, for example, in FIG. 7 a modified dichroic lens 26a is shown with a flat portion 71 and a curved portion 72. The curved portion 72 extends the right lateral horizontal visual field 16 proportionately to the radius 73 of the curved portion 73 of the dichroic lens 26a. Other modifications may include an open loop 75 on the modified spacer bar 33a. The open loop 75 permits the angular displacement between the lens 21 and dichroic lens 26 to be changed by merely opening or closing the loop 75.

Having thus described the invention, it will be evident that other modifications and improvements may be made by one skilled in the art which would come within the scope of the annexed claims.

What is claimed as new and desired to be secured by Letters Patent of the United States is:

1. An Homonymous Hemianopsia lateral view extender device for use with eyeglasses having a pair of lenses and a nose bridge separating said pair of lenses, said device comprising:
   (a) a dichroic half lens having the combined optical properties of a reflector and a see-through lens,
      (i) said dichroic half lens having an upper edge, and
   (b) means for fixing said dichroic half lens to said nose bridge of said eyeglasses in optical registry with one lens of said pair of lenses for providing at least one optical path through said one lens of said pair of lenses and said dichroic half lens and at least one other path over said upper edge of said dichroic half lens,
      (i) said dichroic lens being disposed relative to said one lens of said pair of lenses to form an interior angle with said one lens of said pair of lenses for providing mirror images on said dichroic lens within said one optical path to thereby extend a lateral view of a person suffering from Homonymous Hemianopsia proportionally to said interior angle formed between said dichroic lens and said one lens of said pair of lenses.

2. The invention defined in claim 1 wherein said dichroic lens is a flat lens.

3. The invention defined in claim 1 wherein said dichroic lens includes a curved portion and a flat portion.

4. The invention defined in claim 1 wherein said dichroic lens includes a first and second flat portion each forming an interior angle with said one lens of said pair of lenses.

5. An Homonymous Hemianopsia lateral view extender device for use with eyeglasses having a pair of lenses and a nose bridge separating said pair of lenses, said device comprising:
   (a) a dichroic half lens having the combined optical properties of a reflector and a see through lens, and
   (b) means for fixing said dichroic half lens to said nose bridge of said eyeglasses in optical registry with one lens of said pair of lenses for providing at least one optical path through said one lens of said pair of lenses and said dichroic half lens and at least one other path over said dichroic half lens,
      (i) said dichroic lens being angularly disposed with said one lens of said pair of lenses to form an interior angle between said dichroic lens and said one lens of said pair of lenses for providing a lateral optical path intersecting said one optical path.

6. The invention defined in claim 5 wherein said dichroic half lens includes an upper straight edge disposed below said one other path.

7. The invention defined in claim 5 wherein said means includes a spacer bar interposed between said dichroic half lens and said eyeglasses.

8. The invention defined in claim 7 wherein said spacer bar includes an adjustable open loop disposed along the length of said spacer bar for selectively varying said interior angle between said dichroic half lens and said one lens of said pair of lenses.

9. The invention defined in claim 5 further including pivot means for folding said dichroic half lens onto said one lens of said pair of lenses.

10. The invention defined in claim 9 wherein said pivot means includes a longitudinal spacer bar and a hinge disposed along the length of said spacer bar.

* * * * *